(12) United States Patent  (10) Patent No.: US 8,370,365 B1
Christian et al.  (45) Date of Patent: *Feb. 5, 2013

(54) TOOLS FOR PREDICTING IMPROVEMENT IN WEBSITE SEARCH ENGINE RANKINGS BASED UPON WEBSITE LINKING RELATIONSHIPS

(75) Inventors: James Christian, Scottsdale, AZ (US); Rajinder Nijjer, Phoenix, AZ (US); Tiffany Rowe, Chandler, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 152 days.

This patent is subject to a terminal disclaimer.

(21) Appl. No.: 13/017,937

(22) Filed: Jan. 31, 2011

(51) Int. Cl.
G06F 7/00 (2006.01)
G06F 17/30 (2006.01)

(52) U.S. Cl. .................. 707/748; 707/723; 707/758

(58) Field of Classification Search ............... 707/723, 707/784, 758, 748
See application file for complete search history.

(56) References Cited

U.S. PATENT DOCUMENTS

| | | | |
|---|---|---|---|
| 5,905,862 A | 5/1999 | Hoekstra | |
| 6,377,961 B1 | 4/2002 | Ryu | |
| 6,523,021 B1 | 2/2003 | Monberg et al. | |
| 6,615,247 B1 | 9/2003 | Murphy | |
| 6,714,934 B1 | 3/2004 | Fordham | |
| 7,082,365 B2 | 7/2006 | Sheha et al. | |
| 7,321,826 B2 | 1/2008 | Sheha et al. | |
| 7,363,296 B1 * | 4/2008 | Naam et al. ............................ 1/1 | |
| 7,548,929 B2 | 6/2009 | Collins et al. | |
| 7,565,630 B1 * | 7/2009 | Kamvar et al. ....................... 1/1 | |
| 7,620,725 B2 | 11/2009 | King et al. | |
| 7,693,827 B2 * | 4/2010 | Zamir et al. ............ 707/999.003 | |
| 2003/0036848 A1 | 2/2003 | Sheha et al. | |
| 2003/0195837 A1 * | 10/2003 | Kostic et al. ..................... 705/37 | |
| 2004/0068460 A1 | 4/2004 | Feeley et al. | |
| 2005/0071741 A1 | 3/2005 | Acharya et al. | |
| 2005/0108325 A1 * | 5/2005 | Ponte ............................ 709/203 | |
| 2005/0198268 A1 | 9/2005 | Chandra | |
| 2005/0256766 A1 | 11/2005 | Garcia et al. | |
| 2006/0106778 A1 | 5/2006 | Baldwin | |
| 2006/0112086 A1 | 5/2006 | Douress et al. | |
| 2006/0200490 A1 | 9/2006 | Abbiss | |
| 2007/0005564 A1 * | 1/2007 | Zehner .............................. 707/2 | |
| 2007/0239680 A1 | 10/2007 | Oztekin et al. | |
| 2008/0177994 A1 | 7/2008 | Mayer | |
| 2008/0215429 A1 * | 9/2008 | Ramer et al. ..................... 705/14 | |
| 2010/0306832 A1 * | 12/2010 | Mu et al. ............................ 726/5 | |

OTHER PUBLICATIONS

"Like A Match.com for Search Marketers, Linker Facilitates Relevant Link Exchanges," TechCrunch Article, Jun. 23, 2010.

(Continued)

*Primary Examiner* — Cam Truong
(74) *Attorney, Agent, or Firm* — Karl A. Fazio

(57) ABSTRACT

The present inventions may be implemented by tools for predicting website search engine rankings. An example system may comprise: a first website having a first IP address hosted on at least one server computer communicatively coupled to a network; a second website having a second IP address hosted on one or more of the at least one server computer; and one or more of the at least one server computers being configured to calculate a link match score indicating whether a search engine ranking for the first website would improve if the first website entered a linking relationship with the second website, wherein the link match score is a function of whether the first IP address is similar to the second IP address.

25 Claims, 18 Drawing Sheets

OTHER PUBLICATIONS

"Eightfold Logic Intends to Link Up Potential Business Partners," Search Engine Watch Article, Jun. 23, 2010.

"Eightfold Logic Reinvents Linking to Maximize SEO Results—'Linker' Gives Businesses Easy and Meaningful Ways to Link and Be Found," Marketwire Article, Jun. 23, 2010.

Feb. 2, 2011 screenshots from www.linker.eightfoldlogic.com website.

Nov. 8, 2012 office action in related U.S. Appl. No. 13/017,921.

Dec. 3, 2012 office action in related U.S. Appl. No. 13/017,953.

* cited by examiner

TOOLS FOR PREDICTING IMPROVEMENT IN WEBSITE SEARCH ENGINE RANKINGS BASED UPON WEBSITE LINKING RELATIONSHIPS

CROSS REFERENCE TO RELATED PATENT APPLICATIONS

This patent application is related to the following concurrently-filed patent applications, each of which are assigned to Go Daddy Operating Company, LLC and incorporated herein by reference:

U.S. patent application Ser. No. 13/017,921 entitled: "PREDICTING IMPROVEMENT IN WEBSITE SEARCH ENGINE RANKINGS BASED UPON WEBSITE LINKING RELATIONSHIPS;" and U.S. patent application Ser. No. 13/017,953 entitled: "WEBSITE LINKING AND MONITORING SERVICE PROVIDING IMPROVED WEBSITE SEARCH ENGINE RANKINGS."

FIELD OF THE INVENTION

The present inventions generally relate to the Internet and, more particularly, methods and tools for predicting and improving website search engine rankings based upon website linking relationships.

SUMMARY OF THE INVENTION

An example embodiment of a method for predicting website search engine rankings may comprise the step of calculating a link match score indicating whether a search engine ranking for a first website having a first IP address would improve if the first website entered a linking relationship with a second website having a second IP address, wherein the link match score is a function of whether the first IP address is similar to the second IP address.

An example embodiment of a tool for predicting website search engine rankings may comprise: a first website having a first IP address hosted on at least one server computer communicatively coupled to a network; a second website having a second IP address hosted on at least one server computer; and at least one server computer configured to calculate a link match score indicating whether a search engine ranking for the first website would improve if it entered a linking relationship with the second website, wherein the link match score is a function of whether the first IP address is similar to the second IP address.

An example embodiment of a method for implementing a website linking service providing improved website search engine rankings may comprise the steps of: receiving, from an operator of a first website, a request to enter a linking relationship with at least one of a plurality of websites; determining whether a search engine ranking for the first website would improve if the first website entered a linking relationship with a second website selected from the plurality of websites; and (responsive to a determination that the search engine ranking would improve) installing a first link to the first website on the second website and a second link to the second website on the first website.

The above features and advantages of the present inventions will be better understood from the following detailed description taken in conjunction with the accompanying drawings.

DETAILED DESCRIPTION

Figure 1:
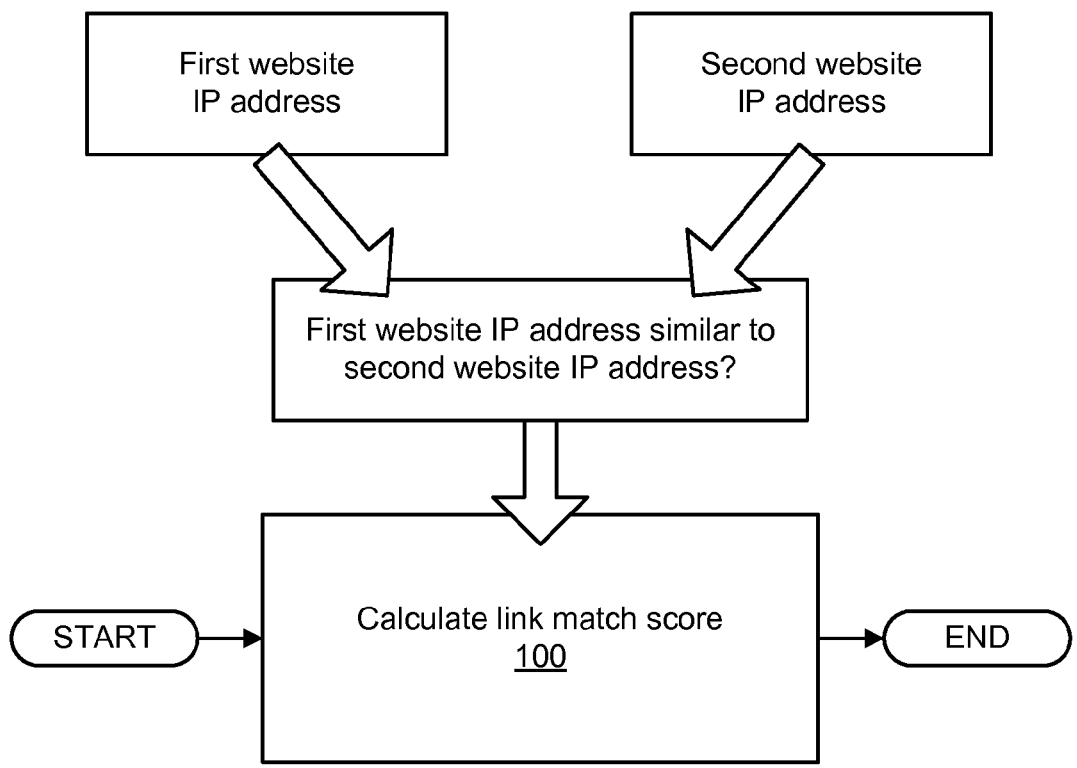
FIG. 1 is a flow diagram illustrating a possible embodiment of a method for predicting website search engine ranking based upon website linking relationships.

The present inventions will now be discussed in detail with regard to the attached drawing figures which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related webpages. Menus and links may be used to move between different webpages within the website or to move to a different website as is known in the art. The interconnectivity of webpages enabled by the Internet can make it difficult for Internet users to tell where one website ends and another begins. Websites may be created using HyperText Markup Language (HTML) to generate a standard set of tags that define how the webpages for the website are to be displayed.

Websites, unless extremely large and complex or have unusual traffic demands, typically reside on a single server and are prepared and maintained by a single individual or entity. Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting service providers typically provide the hardware, software, and electronic communication means necessary to connect multiple websites to the Internet. A single hosting service provider may literally host thousands of websites on one or more hosting servers.

Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each website, resource, and computer on the Internet has a unique Internet Protocol (IP) address (e.g., 64.202.167.32, an IPv4 address, or 2EDC:BA98:0332:0000:CF8A:000C:2154:7313, an IPv6 address). IP addresses, however, even in such human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain. An example of a URL with a HTTP request and domain is: http://www.companyname.com. In this example, the "http" identifies the URL as a HTTP request and the "companyname.com" is the domain.

Internet users may locate websites via search engines that search for information on the World Wide Web. Commercially-available search engines include GOOGLE, YAHOO, and MICROSOFT BING. A search engine functions as an information retrieval system that, responsive to a user's search request (e.g., keyword query entered into a data field on a search engine's website), locates and returns links to websites determined by the search engine to be relevant to the submitted keywords. Search engines use various algorithms to determine which websites are most relevant to the submitted keywords.

Although the algorithm used by a specific search engine may be proprietary, it is generally known that many algorithms consider as relevant factors the frequency and location of terms on a website and the way that the website links to other websites on the Web. Websites having terms deemed relevant to the submitted keywords may be given a higher ranking. Similarly, websites that are linked to other websites deemed relevant to the submitted keywords (e.g., the other websites contain hyperlinks to the subject website) also may be given a "boost" in relevancy ranking by the search engine. Search engines generally return results, perhaps in list form on a results webpage, such as a list of vertically-arranged links, placing those links deemed (by the search engine's algorithm) to be most relevant to the submitted keywords in the most prominent location on the search result webpage (e.g., the top of the list).

Search Engine Optimization (SEO) is the process of analyzing search engines and their algorithms to identify the factors used by the search engine to determine website relevancy, and using those factors to improve a website's ranking, and therefore obtain a more prominent placement on the search engine results webpage. Optimizing a website for improved SEO ranking may include editing its content, HTML, metadata, and/or associated code to increase its relevance to specific keywords. It also may comprise promoting the website to other website operators to increase the number of inbound links to the website.

Link building, therefore, is one of the many strategies employed by website operators to improve their websites' search ranking. Successful link building, however, is time-consuming and laborious, requiring the website operator to research other websites, reach out to their operators, and agree to exchange and install links. Applicant has determined that presently-existing systems and methods do not provide optimal means for predicting, recommending, implementing, or monitoring successful link building relationships. Specifically, there is a need for the methods and tools for predicting website search engine rankings based upon website linking relationships and recommending, implementing, and monitoring such website linking relationships as described herein.

Predicting Improved Website Search Engine Rankings Based Upon Website Linking Relationships FIG. 1 illustrates a possible embodiment of a method for predicting website search engine ranking based upon website linking relationships that may comprise the step of calculating a link match score (Step 100) indicating whether a search engine ranking for a first website having a first IP address would improve if the first website entered a linking relationship with a second website having a second IP address, wherein the link match score may be a function of whether the first IP address is similar to the second IP address.

As a non-limiting example, the method illustrated in FIG. 1 (and all methods described herein) may be performed by any central processing unit (CPU) in one or more computing devices or systems, such as a microprocessor running on a server computer communicatively coupled to a network (e.g., the Internet) and executing instructions stored (perhaps as scripts and/or software) in computer-readable media accessible to the CPU, such as a hard disk drive or solid-state memory on a server computer.

As discussed above, the first website's search engine ranking refers to the position at which the first website would appear on a search engine results page responsive to a query. The first website would have a higher ranking if it appears in a prominent or preferential location on the search result webpage (e.g., the top of the list) and vice versa.

A link match score may be calculated that may predict whether the first website's search engine ranking would benefit (e.g., improve) if the first website entered a link relationship with a second website (Step 100). A linking relationship between the first website and the second website might be unilateral or bilateral. In a unilateral linking relationship, only one website has a link to the other (e.g., the second website contains a hyperlink to the first website, but the first website does not contain a hyperlink to the second website). In a bilateral (e.g., reciprocal) linking relationship, both websites have links to each other.

One reason the first website's search engine ranking may benefit from such a relationship is that many search engine rankings are based (in part) on the number and quality of inbound links to a website. Thus, the mere existence of an inbound link from the second website to the first website may cause various search engines to raise or improve the first website's ranking. However, many search engines discount or disregard inbound links that are obvious attempts to spoof the search engine ranking algorithm. For example, inbound links from a website operated by the same individual or entity as the receiving website may be discounted or disregarded when a rank is determined.

One possible method of calculating such a link match score may comprise determining whether the first website's IP address is similar to the IP address of the second website because similar IP addresses may indicate commonality of website ownership. As a non-limiting example, a link match score may indicate an improved search engine ranking for the first website where its IP address does not match the second website's IP address. This is true because, although many search engines may "boost" a website's rankings based upon the number of inbound links, they also attempt to factor in the quality of such links. They do this by analyzing the servers hosting the first and second websites. If the IP addresses are similar for both, this may indicate a common website operator attempting to spoof the search engine's algorithm by installing mutual links between his own websites to falsely raise his website's rank. To combat this, search engine ranking algorithms may not improve a website's rank—even if the website has inbound links—if the inbound links come from a website hosted on the same server or network.

Thus, a calculated link match score for a website may be high (therefore predicting an improved ranking) where the second website's IP address differs from the IP address of the first website because differing IP addresses indicate different website operators and, therefore, legitimate inbound links. As a specific non-limiting example, where the first and second websites are hosted on servers using class C IPv4 IP addresses, the link match score may be a function of whether the first three octets of the first website's IP address matches the first three octets of the second website's IP address. For example, the link match score may indicate an improved search engine ranking for the first website where the first three octets of its IP address do not match the first three octets of the second class C IP address.

There are five IPv4 IP classes (A-E), each class using 32-bit IP addresses, which are each divided into four octets (eight-bit sections), such as 64.202.167.32. Class C addresses, often used by businesses and hosting providers, range from 192.0.1.1 to 233.255.254.254, and use the first three octets to identify the network. The fourth octet identifies the computer connected to the network. Thus, class C IP addresses may support over two million different networks, each of which may support 254 computers. Linked websites having a different first three octets of a class C IP address are more likely to have different operators, less likely to have spoofed links, and more likely to have a higher search engine ranking.

A higher calculated link match score may indicate an improved search engine ranking for the first website should it enter a linking relationship with the second website. The link match score itself may comprise any rating or ranking scale known in the art or developed in the future. As non-limiting examples, the link match score may range from 0 to 1, 1 to 10, 0% to 100%, and/or A+ to F– (e.g., grades). Alternatively, it may comprise a star rating system or a color rating system (e.g., red indicates a poor quality match, yellow indicates an average quality match, and green indicates a good match).

As one non-limiting example, the range for link match scores may have a minimum value of 0% and a maximum value of 100%, and may indicate an improved search engine ranking for the first website if it exceeds a score of 50%. Where the link match score if a function of whether the first website's IP address is similar to the IP address of the second website, the link match score may be initially set at 50% where the IP addresses are different.

Figure 2:
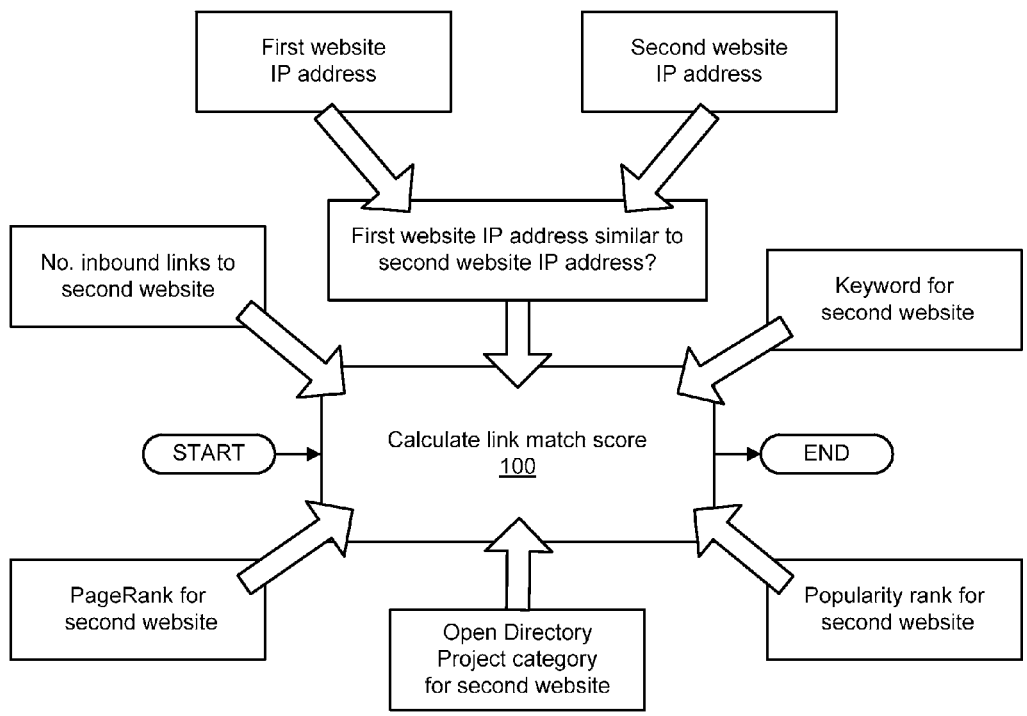
FIG. 2 is a flow diagram illustrating a possible embodiment of a method for predicting website search engine ranking based upon website linking relationships.

FIG. 2 illustrates an alternate method embodiment that builds upon that illustrated in FIG. 1, wherein the link match score further may be a function of a number of inbound links to the second website, a PageRank for the second website, whether an Open Directory Project category for the first website matches an Open Directory Project category for the second website, whether a keyword for the first website matches a keyword for the second website, and/or a popularity rank for the second website. The link match score may be a function of one, some, or all of these variables.

The number of inbound links (also known as backlinks, incoming links, inlinks, and inward links) to the second website (or any of its webpages) may be factored into the link match score calculation. An inbound link is any link received by a web node (web page, directory, website, or top level domain) from another web node. The number of inbound links is an indication of the popularity or importance of the second website. For example, the more that other websites link to the second website, the more hits the second website is likely to receive. Thus, the first website's search engine ranking is likely to increase if linked to the second website because the second website would have a higher ranking itself.

The illustrated method may use any system, process, or method known in the art or developed in the future to determine the number of inbound links to the second website. As a few non-limiting examples, YAHOO!'s Site Explorer Application Programming Interface (API) or GOOGLE Analytics services may analyze the second website and determine the number of inbound links. Alternatively, proprietary software may be written to analyze the second website and determine the number of inbound links.

Once the number of inbound links have been determined, the calculated link match score for the first website may increase or decrease according to the determined number of inbound links to the second website. For example, the link match score may be set at a higher value if the number of inbound links to the second website is greater than 1. Continuing with the above example, if the link match score was initially set at 50% because the IP addresses for the first and second website are different, the link match score may be reset to a higher value (e.g., 60%) if the second website has more than one inbound link.

The GOOGLE PageRank for the second website also may be factored into the link match score calculation. PageRank is a link analysis algorithm that assigns a numerical weighting to each element of a hyperlinked set of documents (such as webpages and websites on the Internet) to calculate reach document's relative importance. Thus, a website's PageRank comprises a numerical value that represents how important or popular a website is, according to GOOGLE's proprietary algorithm. The PageRank algorithm is made available for public use via an exposed API and GOOGLE's website. Users merely need to submit a website's URL, and the PageRank is returned, generally as a whole number between zero and ten. The most popular websites have a PageRank of ten and the least popular have a PageRank of zero.

Once the PageRank for the second website been determined, the calculated link match score for the first website may increase or decrease according to the determined PageRank score. For example, the Link match score may be reset to a higher value if the PageRank for the second website is greater than one. Continuing with the above example, if the link match score was initially set at 50% because the IP addresses for the first and second website are different and subsequently reset to 60% because the second website has more than one inbound link, the link match score again may be reset to a higher value (e.g., 70%) if the second website has a PageRank greater than one.

Another variable that may factor into the link match score is whether an Open Directory Project category for the first website matches an Open Directory Project category for the second website. The Open Directory Project (ODP) is an open content directory of websites that is maintained and edited by a community of volunteer editors. It uses a hierarchical ontology scheme to organize websites according to their content. Websites on similar topics are assigned to relevant categories and grouped accordingly. The ODP-assigned category for a particular website may be determined by entering the website's URL in the search box on ODP's website (www.dmoz.org) or by placing a function call on the ODP's API.

Returning to FIG. 2, once the ODP-assigned category for the first and second websites have been determined, the calculated link match score for the first website may increase (if the categories match) or decreased (if they do not match). Continuing with the above example, if the link match score was initially set at 50% because the IP addresses for the first and second website are different, reset to 60% because the second website has more than one inbound link, and raised to 70% because the second website has a PageRank of greater than one, it may again be raised if the ODP-assigned categories for the first and second websites match (e.g., to 80%).

Another variable that may factor into the link match score is whether a keyword for the first website matches a keyword for the second website. Websites having keywords in their text, HTML code, and/or metadata that match—or are ontologically similar to—search terms are more likely to return as a hit in a search. Thus, for improved SEO rankings, it is important for a linking relationship that linked websites have matching, or similar, keywords. Keyword for the first or second websites may be received from their respective website operators, perhaps during the process of registering for (or otherwise requesting) a linking relationship for their respective websites. Alternatively, website keywords may be determined by crawling the first and/or second websites. This may be accomplished by a Web crawler, which may comprise software running on a server that may browse the first and second websites, analyze their links, HTML code, text and other content, and/or metadata to identify keywords that may be indicative of the websites' subject matter.

Once keywords for the first and second websites have been determined, the calculated link match score for the first website may increase (if the categories match) or decreased (if they do not match). Continuing with the above example, if the link match score was initially set at 50% because the IP addresses for the first and second website are different, reset to 60% because the second website has more than one inbound link, raised to 70% because the second website has a PageRank of greater than one, and raised to 80% because their ODP-assigned categories for the first and second websites match, the link match score may again be raised (e.g., to 90%) if matching keywords are found.

Another variable that may factor into the link match score is a popularity rank for the second website. The link match score reset at a higher value if the popularity of the second website is high (of reduced if it is low). The disclosed method embodiments may utilize any system or method of quantifying or otherwise ranking the popularity a website including, but not limited to using a website's ALEXA ranking as a variable in the link match score calculation.

ALEXA is a company that provides Internet users with a toolbar that, once installed on a user's browser, collects data on browsing behavior. The data then is transmitted to ALEXA where it is analyzed and used to generate website popularity rankings A website having an ALEXA score of one indicates that the website is the most visited website on the Internet. A score of 1000 similarly indicates that it ranks as the $1000^{th}$ most visited website. ALEXA makes its rankings available to the public through a comprehensive set of web services and APIs.

Once the second website's ALEXA ranking has been determined, the calculated link match score for the first website may increase if the ranking is high (e.g., a low ALEXA score) or decreased if low (e.g., a high ALEXA score). Continuing with the above example, if the link match score was initially set at 50% because the IP addresses for the first and second website are different, reset to 60% because the second website has more than one inbound link, raised to 70% because the second website has a PageRank of greater than one, raised to 80% because their ODP-assigned categories for the first and second websites match, and raised to 0.9 because matching keywords were found, it may be lowered (e.g., back to 80%) if the second website's ALEXA ranking is high (e.g., a poor ranking).

Figure 3:
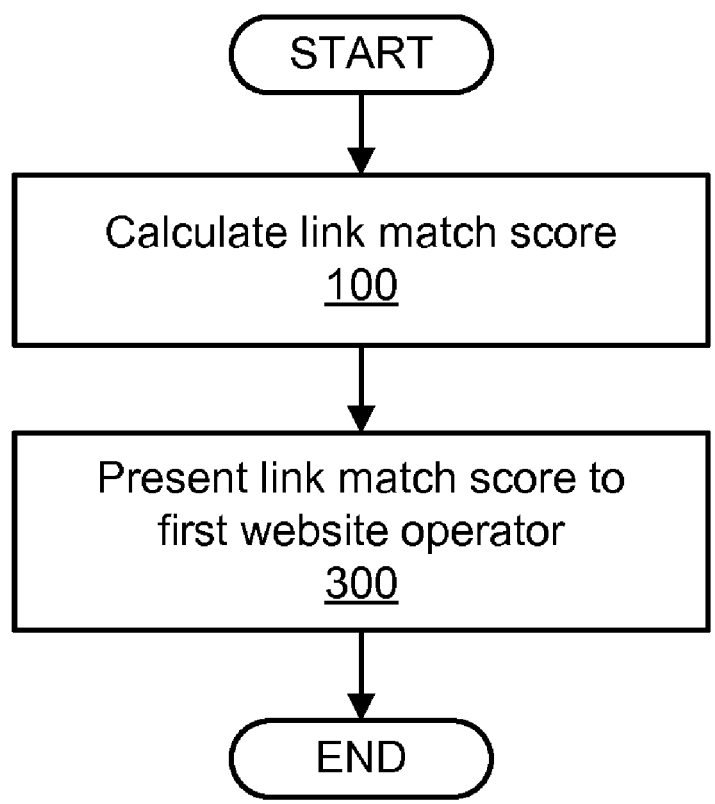
FIG. 3 is a flow diagram illustrating a possible embodiment of a method for predicting website search engine ranking based upon website linking relationships and presenting results to a website operator.

FIG. 3 illustrates an alternate embodiment of a method for predicting website search engine ranking based upon website linking relationships that builds upon the embodiments illustrated in FIGS. 1 and 2, and further comprises the step of presenting the calculated link match score to the operator of the first website (Step 300). The link match score may be presented or transmitted to the website operator via any means of presenting or transmitting data known in the art or developed in the future including, but not limited to, sending an HTTP transmission to the website operator that, when rendered in a browser on a client computer, displays the link match score on the client's display.

Such data (and any other data described herein) may be transmitted or received via any method of data transfer know in the art or developed in the future. Such data transfer methods can generally be classified in two categories: (1) "pull-based" data transfers where the receiver initiates a data transmission request; and (2) "push-based" data transfers where the sender initiates a data transmission request. Both types are expressly included in the embodiments illustrated herein, which also may include transparent data transfers over network file systems, explicit file transfers from dedicated file-transfer services like FTP or HTTP, distributed file transfers over peer-to-peer networks, file transfers over instant messaging systems, file transfers between computers and peripheral devices, and/or file transfers over direct modem or serial (null modem) links, such as XMODEM, YMODEM and ZMODEM. Data streaming technology also may be used to effectuate data transfer. A data stream may be, for example, a sequence of digitally encoded coherent signals (packets of data) used to transmit or receive information that is in transmission. Any data transfer protocol known in the art or developed in the future may be used including, but not limited to those used with TCP/IP (e.g., FTAM, FTP, HTTP, RCP, SFTP, SCP, or FASTCopy), those used with UDP (e.g., TFTP, FSP, UFTP, or MFTP), those used with direct modem connections, HTTP streaming, Tubular Data Stream Protocol (TDSP), Stream Control Transmission Protocol (SCTP), and/or Real Time Streaming Protocol (RTSP).

As alternative non-limiting examples, the link match score may be transmitted via any electronic communication, such as an email message or Short Message Service (SMS) message (i.e., text message), or via any other means, such as via a written, typewritten, faxed, or mailed document, or via oral communication. Depending on the scoring scheme used, the score may be presented as a range from 0 to 1, 1 to 10, 0% to 100%, A+ to F- (e.g., grades), a star rating system, or a color rating system (e.g., red indicates a poor quality match, yellow indicates an average quality match, and green indicates a good match).

Figure 4:
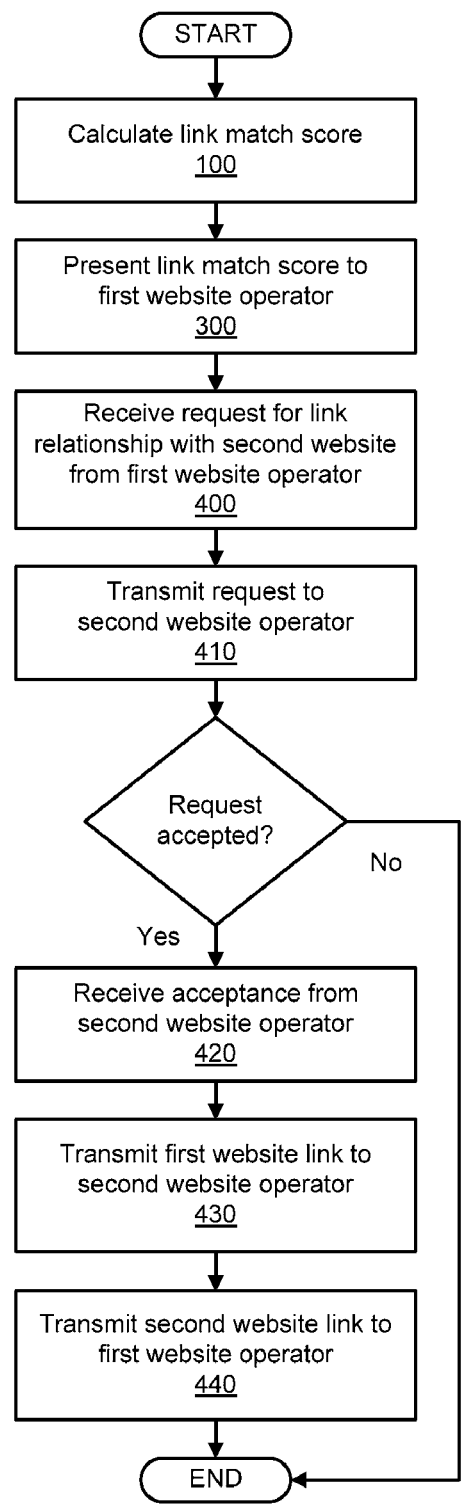
FIG. 4 is a flow diagram illustrating a possible embodiment of a method for predicting website search engine ranking based upon website linking relationships and implementing a website linking relationship.

FIG. 4 illustrates a method embodiment that builds upon that illustrated in FIG. 3 and may further comprise the step of (perhaps responsive to the first website operator receiving and reviewing the link match score) receiving from the first website operator a request to enter a linking relationship with the second website (Step 400). After this request is received, it may be transmitted to the second website operator (Step 410), who may decide whether to accept the request and enter the linking relationship with the first website. Alternatively, rather than re-transmitting the request from the first website owner to the second website owner, the request may be directly transmitted to the second website operator. If the second website operator accepts the request and agrees to enter the linking relationship with the first website, the acceptance may be received (Step 420) thereby establishing mutual intent to establish the linking relationship.

Once both first and second website operators consent to the linking relationship, a first code comprising a first link to the first website may be transmitted to the second website's operator (Step 430) and/or a second code comprising a second link to the second website may be transmitted to the first website's operator (Step 440) for installation on their respective websites. The first and second code may comprise any computer program, software, or script that, when received and installed on a website provides a hyperlink to the linked-to website. As a non-limiting example, the link codes may comprise pre-formatted HTML code transmitted to the website operator, perhaps as an email attachment.

Figure 5:
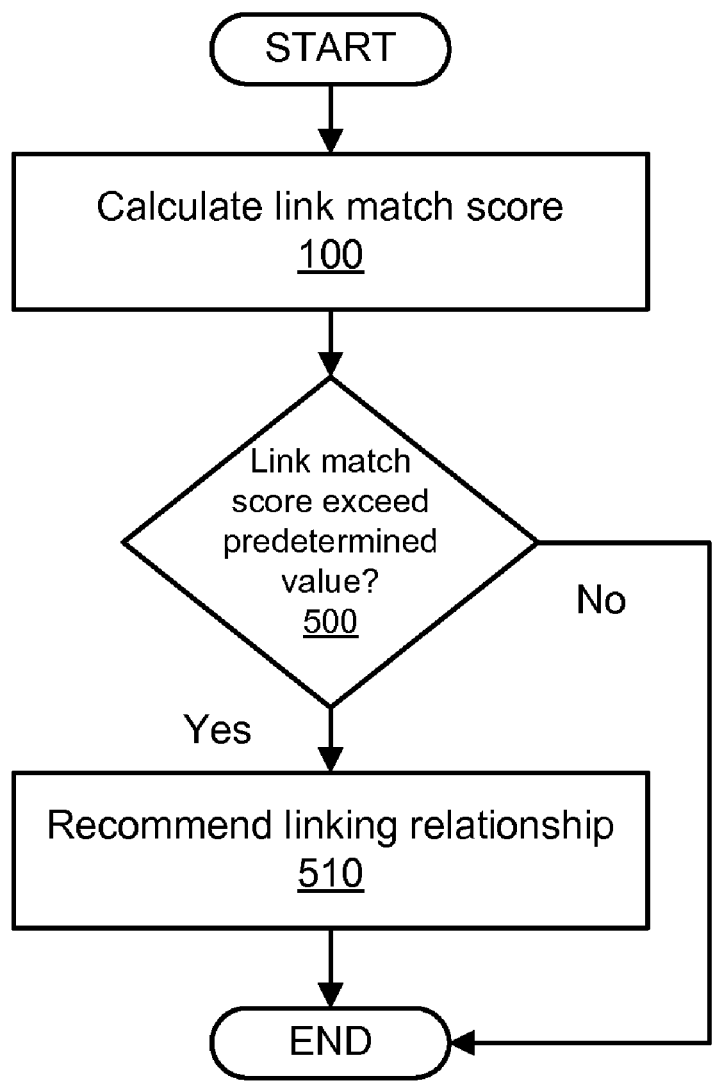
FIG. 5 is a flow diagram illustrating a possible embodiment of a method for predicting website search engine ranking based upon website linking relationships and recommending a website linking relationship.

FIG. 5 illustrates an alternate embodiment of a method for predicting website search engine ranking based upon website linking relationships that builds upon the embodiments illustrated in FIGS. 1 and 2, and further comprises the steps of (after calculating a link match score (Step 100)) determining whether the link match score exceeds a predetermined value (Step 500) and, responsive to a determination that the link match score exceeds the predetermined value, recommending the linking relationship to an operator of the first website or an operator of the second website (Step 510).

The predetermined value (e.g., score) may comprise the threshold limit at which a linking relationship to the second website may be recommended or suggested to the first website operator. The predetermined value may be received from the first website operator when he signs up for a link matching service. Alternatively, the link match service provider may generate a threshold predetermined value above which linking relationships will be recommended.

Continuing with the above example, if a 0% to 100% link match score scale is used, the first website owner may indicate, perhaps via a data field on a link match service provider's webpage, that he wishes to receive link match recommendations only if the calculated link match score exceeds 70%. If the calculated link match score for a potential matching website (e.g., the second website) exceeds 70%, a linking relationship between the first and second website may be recommended (Step 510).

A linking relationship may be recommended (Step 510) by any of the means of communication and/or transmitting and receiving data described above. In one non-limiting example, the link match service provider may transmit email (or any other electronic communications) to the first website operator and/or the second website operator. The electronic communication may provide the first website operator with contact information for the second website operator (and/or vice versa), such as email address, telephone number, website URL, etc., thereby enabling the website operators to directly contact each other and install links to each other's website. Alternatively, the link match provider may transmit links to the respective website operators as described above with respect to Steps 430 and 440.

Figure 6:
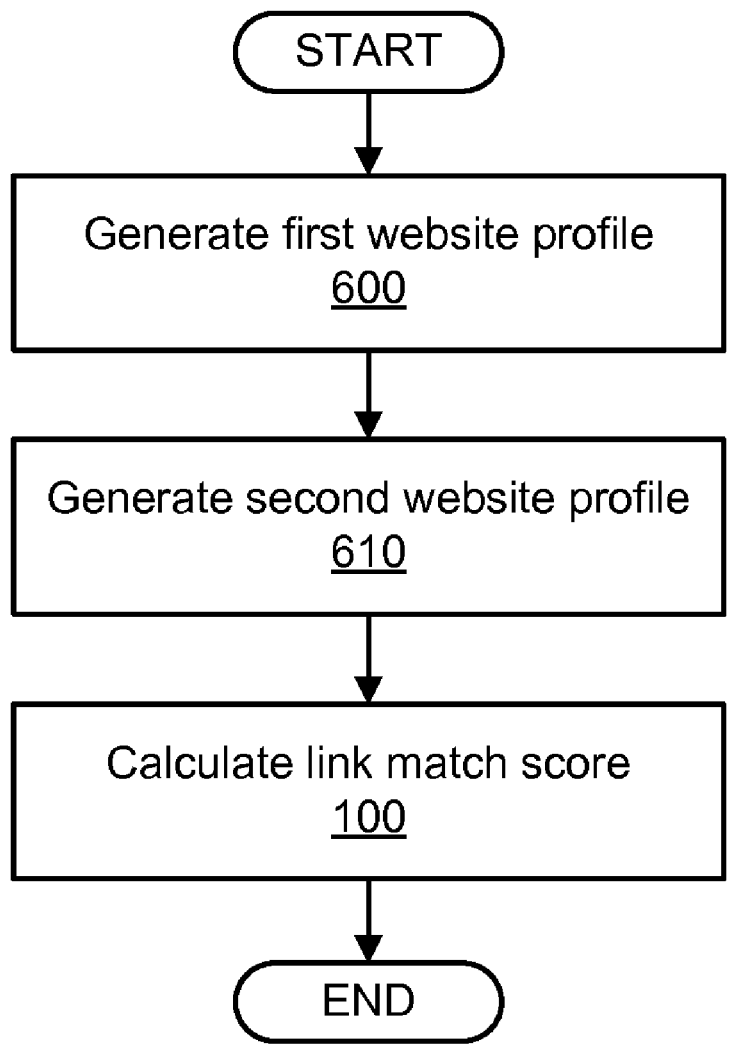
FIG. 6 is a flow diagram illustrating a possible embodiment of a method for predicting website search engine ranking based upon website linking relationships.

FIG. 6 illustrates a possible embodiment of a method for predicting website search engine ranking based upon website linking relationships that may comprise the steps of: generating a first website profile for a first website (Step 600); generating a second website profile for a second website (Step 610); and calculating a link match score indicating whether a search engine ranking for the first website would improve if the first website entered a linking relationship with the second website (Step 100).

Figure 7:
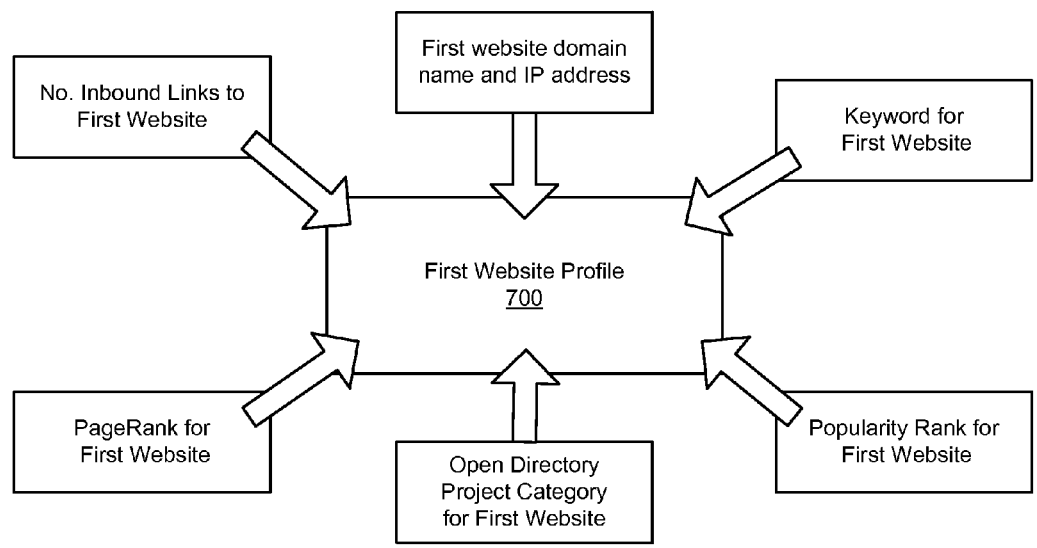
FIG. 7 illustrates a first website profile that may be used to predict website search engine ranking based upon website linking relationships.

The first website profile 700 is illustrated in FIG. 7 and, as non-limiting examples, may comprise any data structure (e.g., data file, spreadsheet, database record, etc.) storing in association information about the first website including, but not limited to: a domain name for the first website; an IP address for the first website; a number of inbound links to the first website; a PageRank for the first website; an Open Directory Project category for the first website; at least one keyword for the first website; and/or a popularity ranking for the first website.

Figure 8:
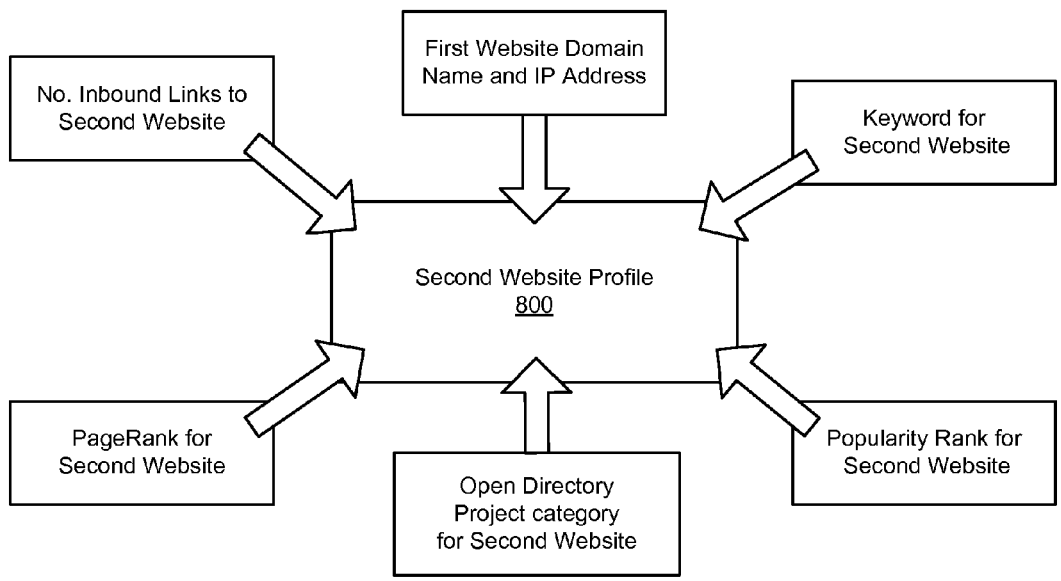
FIG. 8 illustrates a second website profile that may be used to predict website search engine ranking based upon website linking relationships.

The second website profile 800 is illustrated in FIG. 8 and, as non-limiting examples, may comprise any data structure (e.g., data file, spreadsheet, database record, etc.) storing in association information about the second website including, but not limited to: a domain name for the second website; an IP address for the second website; a number of inbound links to the second website; a PageRank for the second website; an Open Directory Project category for the second website; at least one keyword for the second website; and/or a popularity ranking for the second website.

As a non-limiting example, the first website profile 700 and second website profile 800 may be generated (Steps 600 and 610), perhaps by software and/or scripts running on at least one server, by receiving information regarding the relevant website (e.g., domain name, URL, website category, website operator contact information, etc.) directly from the website operator. Additional information (PageRank, ALEXA ranking, number of inbound links, ODP category, keywords, etc.) then may be determined—perhaps by a Web crawler spidering the websites, determining the additional information, and returning such data to the server generating the website profiles.

Once the website profiles have been generated (Steps 600 and 610), the link match score may be calculated (Step 100) by determining the degree to which the first website profile 700 correlates with the second website profile 800. If the calculated correlation is high, the link match score may indicate that a search engine ranking for the first website would improve if it entered a linking relationship with the second website.

As a non-limiting example, the calculated correlation could range from 0 to 1 and a correlation of greater than 0.5 may result in a link match score that indicates an improved search engine ranking for the first website. For example, a calculated correlation of 0.8 might result in a green link match score (if a color scoring scheme is used), a B score (if a grading scoring scheme is used), or an 80% score (if a percentage scoring scheme is used).

The calculated correlation may increase or decrease based upon any of the data in the website profiles. As a non-limiting example, the calculated correlation may be initially set at greater than 0.5 where the IP address for the first website does not match the IP address for the second website.

The number of inbound links to the second website also may be factored into the calculated correlation. For example, the calculated correlation may be set at a higher value if the number of inbound links to the second website is greater than 1. Continuing with the above example, if the calculated correlation was initially set at 0.5 because the IP addresses for the first and second website are different, the calculated correlation may be reset to a higher value (e.g., 0.6) if the second website has more than one inbound link.

The GOOGLE PageRank for the second website also may be factored into the calculated correlation. For example, the calculated correlation again may be reset to a higher value (e.g., 0.7) if the second website has a PageRank greater than one.

Another variable that may factor into the calculated correlation is whether an Open Directory Project (ODP) category for the first website matches an ODP category for the second website. Continuing with the above example, the calculated correlation again may be raised if the ODP-assigned categories for the first and second websites match (e.g., to 0.8).

Another variable that may factor into the calculated correlation is whether a keyword for the first website matches a keyword for the second website. Continuing with the above example, the calculated correlation may again be raised (e.g., to 0.9) if matching keywords are found.

Another variable that may factor into the calculated correlation is a popularity rank for the second website, such as its ALEXA ranking. For example, the calculated correlation may be lowered (e.g., back to 0.8) if the second website has a poor ALEXA (or other popularity) ranking.

Figure 9:
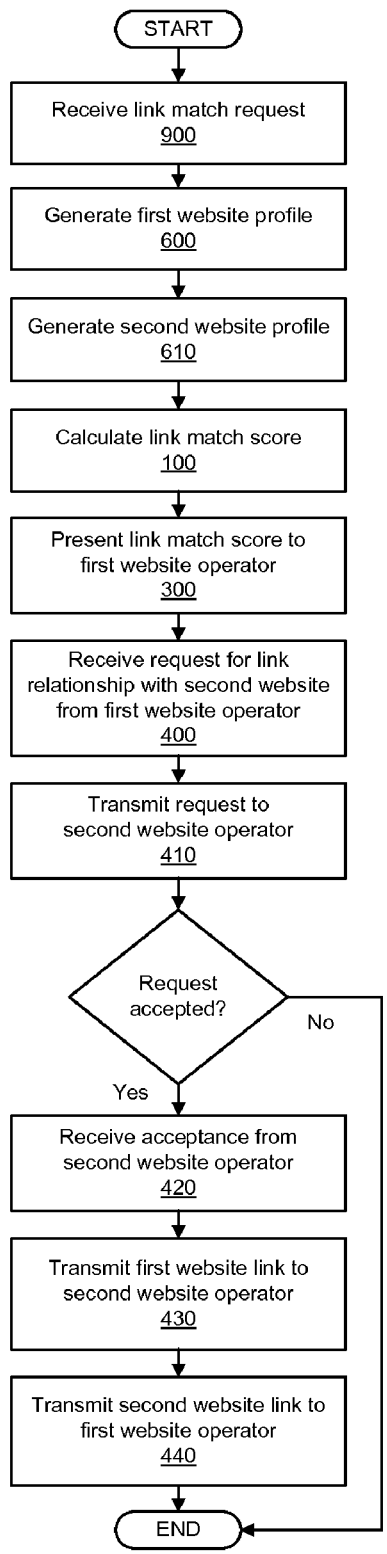
FIG. 9 is a flow diagram illustrating a possible embodiment of a method for predicting website search engine ranking based upon website linking relationships and implementing a website linking relationship.

FIG. 9 illustrates a more detailed embodiment of a method for predicting website search engine ranking based upon website linking relationships that builds upon the embodiments illustrated in FIGS. 6 through 8, and further comprises the above-described steps of: presenting the link match score to an operator of the first website (Step 300); receiving from the operator of the first website a request to enter the linking relationship with the second website (Step 400); transmitting the request to an operator of the second website (Step 410); receiving from the operator of the second website an acceptance of the request (Step 420); transmitting, to the operator of the first website, a second code comprising a second link to the second website (Step 440); and transmitting, to the operator of the second website, a first code comprising a first link to the first website (Step 430). The illustrated embodiment also comprises the step of (perhaps prior to step A), receiving from an operator of the first website a request for a linking relationship with at least one of a plurality of websites that may be participating in the link match service (Step 900).

Figure 10:
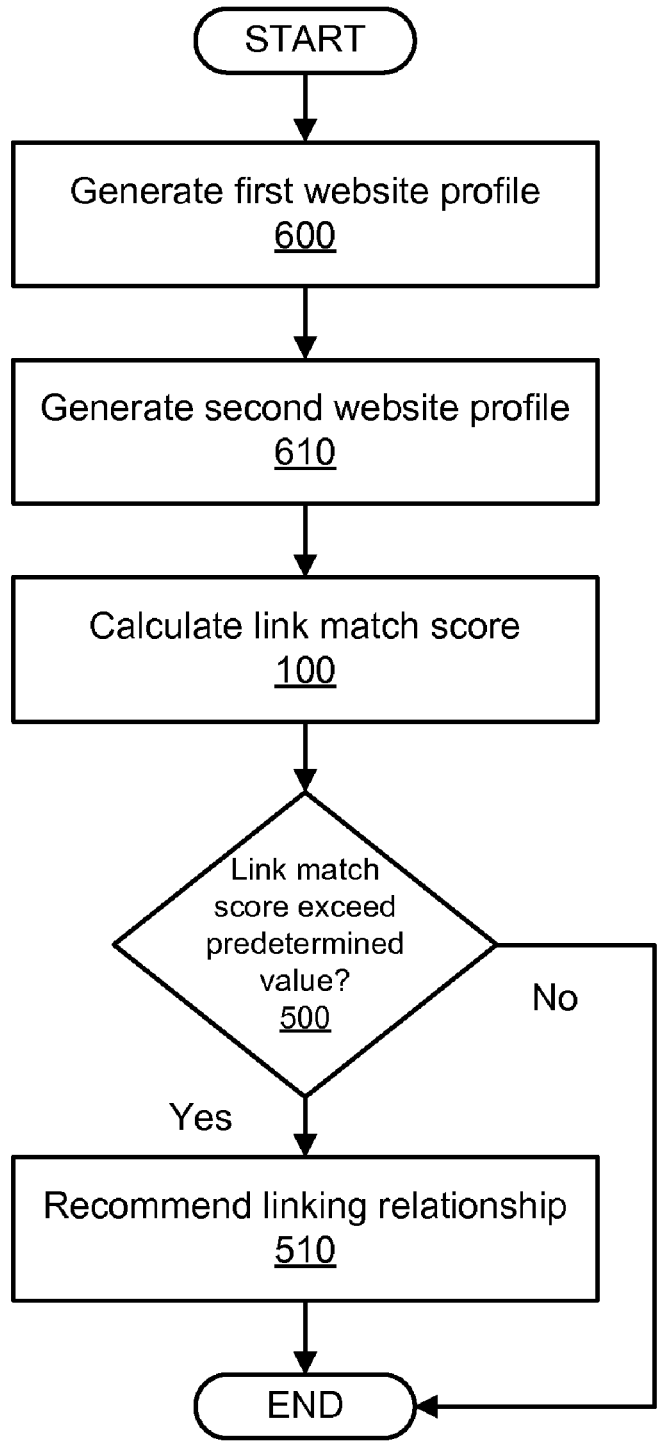
FIG. 10 is a flow diagram illustrating a possible embodiment of a method for predicting website search engine ranking based upon website linking relationships and recommending a website linking relationship.

FIG. 10 illustrates an alternate embodiment of a method for predicting website search engine ranking based upon website linking relationships that builds upon the embodiments illustrated in FIG. 6, and further comprises the steps of (after calculating a link match score (Step 100)): determining whether the link match score exceeds a predetermined value (Step 500) and, responsive to a determination that the link match score exceeds the predetermined value, recommending the linking relationship to an operator of the first website or an operator of the second website (Step 510). Steps 500 and 510 may be accomplished as described in detail above.

Figure 11:
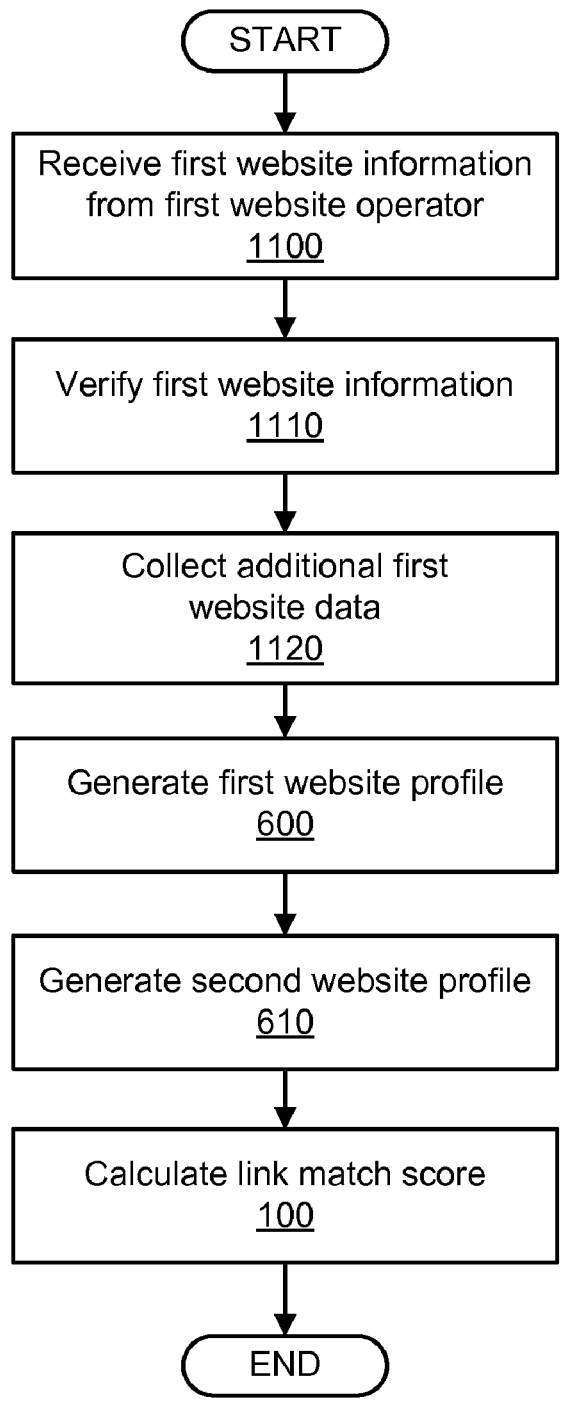
FIG. 11 is a flow diagram illustrating a possible embodiment of a method for predicting website search engine ranking based upon website linking relationships.

FIG. 11 illustrates an alternate embodiment of a method for predicting website search engine ranking based upon website linking relationships that builds upon the embodiments illustrated in FIG. 6, and further comprises (prior to generating a first website profile 700 (Step 600)) receiving at least one information (e.g., domain name, URL, website category, website operator contact information, etc.) about the first website (Step 1100), perhaps from the first website operator. The received information, which may be used to generate the first website profile 700 (Step 600) may be subsequently verified (Step 1110), perhaps by a Web crawler spidering the first website, verifying the submitted information, and returning either a confirmation or denial of the submitted information to the server generating the first website profile 700.

Other information about the first website (e.g., IP address, PageRank, ALEXA or other popularity ranking, number of inbound links, ODP category, keywords, etc.) then may be determined, perhaps by a Web crawler spidering the first website, determining the additional information, and returning such data to the server generating the website profiles 700 and 800 (Step 1120). Both the operator-submitted website information and the data determined in Step 1120 may then be used to generate the first website profile 700.

Figure 12:
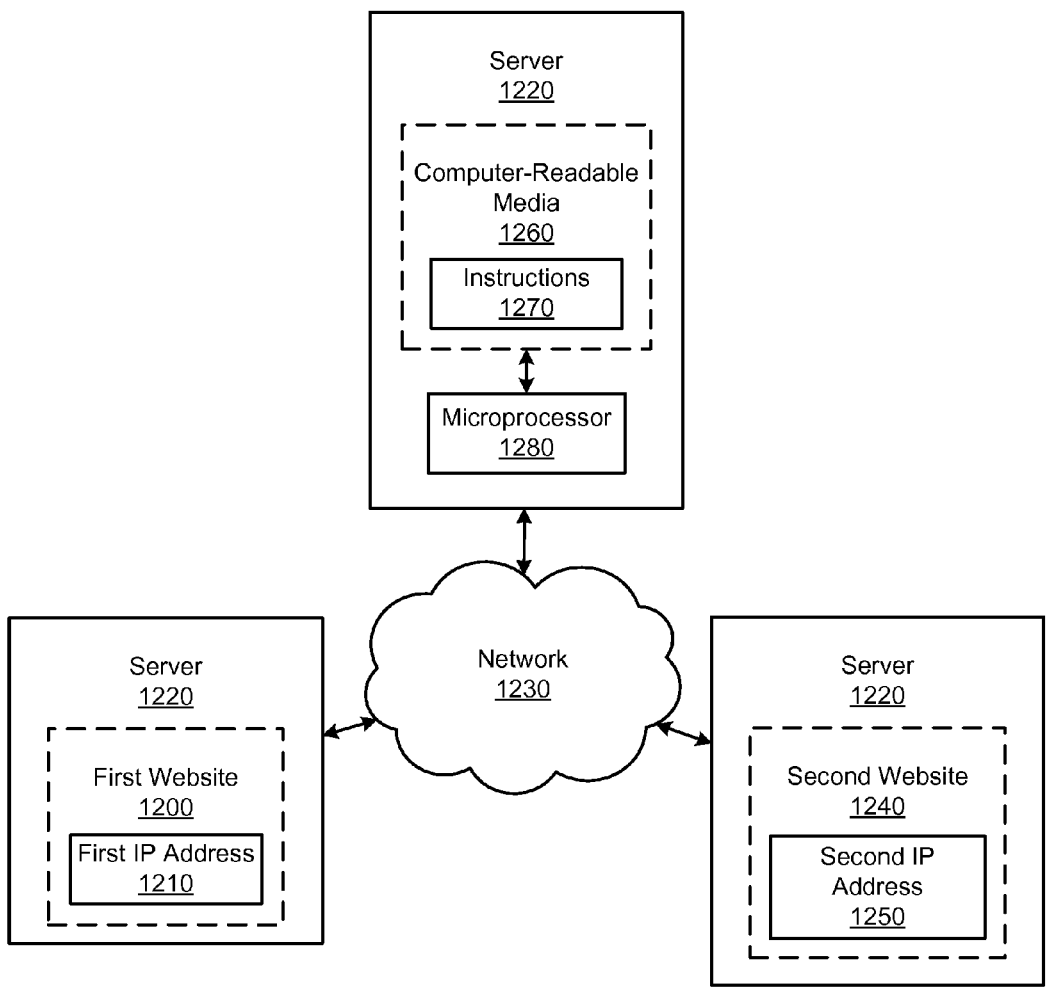
FIG. 12 illustrates a possible embodiment of system that may be used to predict website search engine ranking based upon website linking relationships.

Tools for Predicting Improved Website Search Engine Rankings Based Upon Website Linking Relationships FIG. 12 illustrates an example embodiment of system that may perform the methods described herein. Such a system may comprise, as a non-limiting example: a first website 1200 having a first IP address 1210 hosted on at least one server 1220 communicatively coupled to a network 1230; a second website 1240 having a second IP 1250 address hosted on one or more of the at least one server 1220; and one or more of the at least one server 1220 configured to perform the method steps described in detail elsewhere in this application.

The example embodiments herein place no limitation on network 1230 configuration or connectivity. Thus, as non-limiting examples, the network 1230 could comprise the Internet, the public switched telephone network, the global Telex network, computer networks (e.g., an intranet, an extranet, a local-area network, or a wide-area network), wired networks, wireless networks, or any combination thereof.

Server computers 1220 (and/or client computers used to access the network 1230) may be communicatively coupled to the network 1230 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The first website 1200 and second website 1240 each may comprise any collection of data and/or files accessible to a client or server 1220 communicatively coupled to the network 1230. As a non-limiting example, the first and second websites 1200 and 1240 each may comprise a single webpage or multiple interconnected and related webpages resolving from a domain name, each of which may provide access to static, dynamic, multimedia, or any other content, perhaps by accessing files (e.g., text, audio, video, graphics, executable, HTML, eXtensible Markup Language (XML), Active Server Pages (ASP), Hypertext Preprocessor (PHP), Flash files, server-side scripting, etc.) that enable the website 107 to display when rendered by a browser on a client.

Such files may be stored (i.e., hosted) in any data storage medium capable of storing data or instructions 1270 for access and/or execution by a computing device, such as a server 1220 or client computer. Such data storage may comprise, as non-limiting examples, magnetic, optical, semiconductor, paper, or any other data storage media, a database or other network storage device, hard disk drives, portable disks, CD-ROM, DVD, RAM, ROM, flash memory, and/or holographic data storage, perhaps in a network storage device communicatively coupled to the network 1230, such as a hard drive or other memory on a server 1220.

The at least one server 1220 and/or any other server described herein, could be any computer (i.e., hardware) or program (e.g., software) that provides services to other computers, programs, or users either in the same computer or over a computer network. As non-limiting examples, the at least one server 1220 may comprise an application, communication, mail, database, proxy, fax, file, media, web, peer-to-peer, or standalone server and may use any server format known in the art or developed in the future (possibly a shared hosting server, a virtual dedicated hosting server, a dedicated hosting server, or any combination thereof).

As a non-limiting example, at least one server 1220 may be configured to perform the steps described herein by installing instructions 1270 (e.g., software, scripts, code, etc.) in computer-readable media 1260 on a server 1220 or other computing device that, when executed by a microprocessor 1280 on the server 1220 or other computing device, cause the microprocessor 1280 to accomplish the required step.

The computer-readable media 1260 may comprise any data storage medium capable of storing instructions 1270 for execution by a computing device. It may comprise, as non-limiting examples, magnetic, optical, semiconductor, paper, or any other data storage media, a database or other network storage device, hard disk drives, portable disks, CD-ROM, DVD, RAM, ROM, flash memory, and/or holographic data storage. The instructions 1270 may, as non-limiting examples, comprise software, scripts, code, etc. stored in the computer-readable media 1260 that may be stored locally in a server 1220 or client computer or, alternatively, may be stored in a highly-distributed format in a plurality of computer-readable media 1260 accessible to the computing device via the network 1230, perhaps via a grid or cloud-computing environment.

Figure 13:
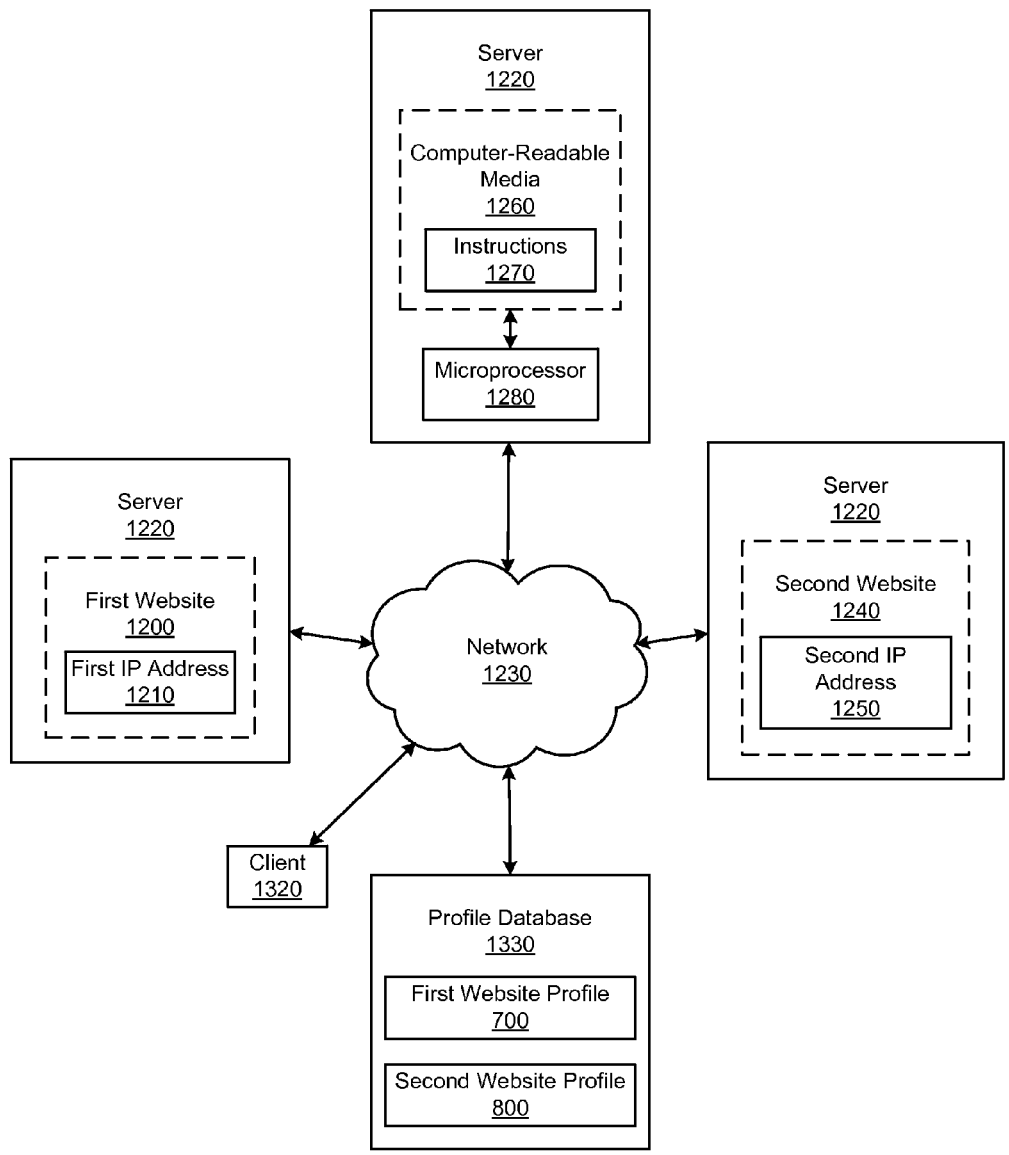
FIG. 13 illustrates a possible embodiment of a system that may be used to predict website search engine ranking based upon website linking relationships.

FIG. 13 illustrates another example embodiment that builds upon the system illustrated in FIG. 12 and may perform the methods described herein. Such a system may comprise, as a non-limiting example: at least one server 1220 configured to calculate a link match score by: generating a first website profile 700 for a first website 1200 (Step 600); generating a second website profile 800 for the second website 1240 (Step 610); and calculating a link match score (Step 100), wherein the link match score is based upon a calculated correlation between the first website profile 700 and the second website profile 800.

The illustrated embodiment further comprises at least one profile database 1330 communicatively coupled to the network 1230 via the methods described above. The profile database 1330 may store the first website profile 700 and/or second website profile 800 generated by the server computer(s) 1220 or other computing device. As a non-limiting example, the profile database 1330 may run on at least one server 1220 and may store the first website profile 700, second website profile 800 and/or other related data, perhaps via database tables 205, database relations, or structured files, which may comprise any set of organized data elements (i.e., values), perhaps organized using a model of vertical columns and horizontal rows.

As non-limiting examples, the profile database 1330 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future.

The systems illustrated in FIGS. 12 and 13 may be accessed by users (e.g., website operators wishing to participate in a link match service offered by an individual or entity practicing the illustrated and claimed embodiments), perhaps by a client 1320 communicatively coupled to the network 1230. Examples of suitable client computers 1320 include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture.

Another tool that may perform the methods described herein may comprise an application programming interface (API) running on at least one server 1220 communicatively coupled to a network 1230. The API may comprise computer-readable code (e.g., instructions 1270 stored in computer-readable media 1260) that, when executed by a microprocessor 1280 on the server computer 1280, causes the server 1220 to perform the method steps described herein.

The API may comprise a software-to-software interface that specifies the protocol defining how independent computer programs interact or communicate with each other. As a non-limiting example, the API may allow website operators' software to communicate and interact with the described inventions—perhaps over the network 1230—through a series of function calls (requests for services). Alternatively, the API may allow third-party entities to offer the link match services described and claimed herein via API-based function calls to the server 1220 running the API, without having to implement such link match functionality on the third-parties own servers. The API may comprise any API type known in the art or developed in the future including, but not limited to, request-style, Berkeley Sockets, Transport Layer Interface (TLI), Representational State Transfer (REST), SOAP, Remote Procedure Calls (RPC), Standard Query Language (SQL), file transfer, message delivery, and/or any combination thereof.

Figure 14:
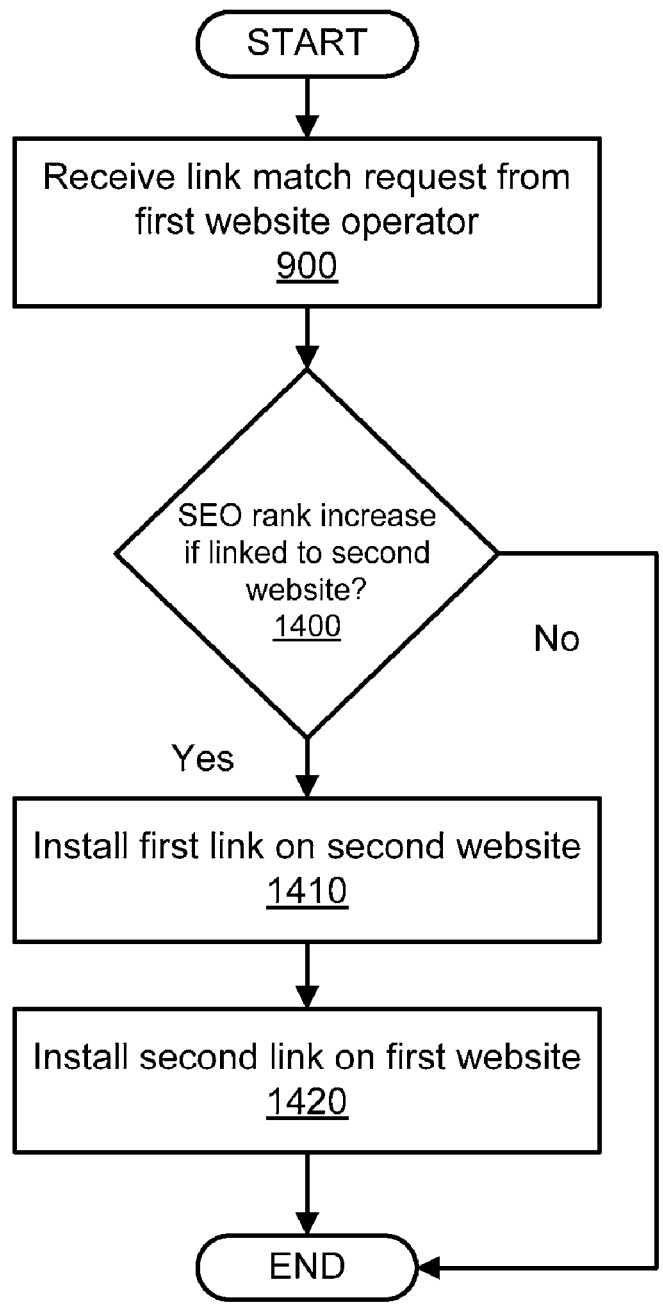
FIG. 14 is a flow diagram illustrating a possible embodiment of a method for predicting website search engine ranking based upon website linking relationships and implementing a website linking relationship.

Website Linking and Monitoring Service Providing Improved Website Search Engine Rankings FIG. 14 illustrates an embodiment of a method for predicting website search engine ranking based upon website linking relationships and implementing a website linking relationship that may comprise the steps of: receiving (perhaps from an operator of a first website 1200) a request to enter a linking relationship with at least one of a plurality of websites (Step 900); determining whether a search engine ranking for the first website 1200 would improve if it entered a linking relationship with a second website 1240 selected from the plurality of websites (Step 1400); and responsive to a determination that the search engine ranking would improve, installing a first link to the first website 1200 on the second website 1240 (Step 1410) and a second link to the second website 1240 on the first website 1200 (Step 1420).

Step 900 may be accomplished by any means or method of receiving a request known in the art or developed in the future including, but not limited to, receiving (perhaps at a server 1220) an HTTP request from the first website 1200 operator comprising information regarding the first website 1200 (e.g., domain name, URL, website category, website operator contact information, etc.) along with a request to participate in a link match service and enter a linking relationship with one or more of the other websites participating in the service.

Step 1400 may be accomplished by first selecting a second website 1240 from the plurality of websites participating in the link match service. The second website 1240 may be randomly or systematically selected and a determination made (Step 1400) whether the first website's 1200 search engine ranking would increase if the websites were to be linked. Alternatively, all websites in the plurality of websites may be analyzed and the first website 1200 operator may be presented with results for one, some, or all of the websites in the plurality of websites. The determination step (Step 1400) may be accomplished by any of the methods of calculating a link match score (Step 100) described above.

Responsive to a determination that the first website's 1200 search engine ranking would improve, the first link to the first website 1200 may be installed on the second website 1240 (Step 1410) and the second link to the second website 1240 may be installed on the first website 1200 (Step 1420). Where the described and claimed link match service is provided by the hosting provider hosting the first website 1200 and the second website 1240, the links may be automatically installed directly on the appropriate websites, perhaps by uploading the appropriate HTML code into the appropriate webpage file in the website's directory. Alternatively, and as described in detail above, a first code comprising a first link to the first website 1200 may be transmitted to the second website's 1240 operator (Step 430) and/or a second code comprising a second link to the second website 1240 may be transmitted to the first website's 1200 operator (Step 440) for installation on their respective websites.

Figure 15:
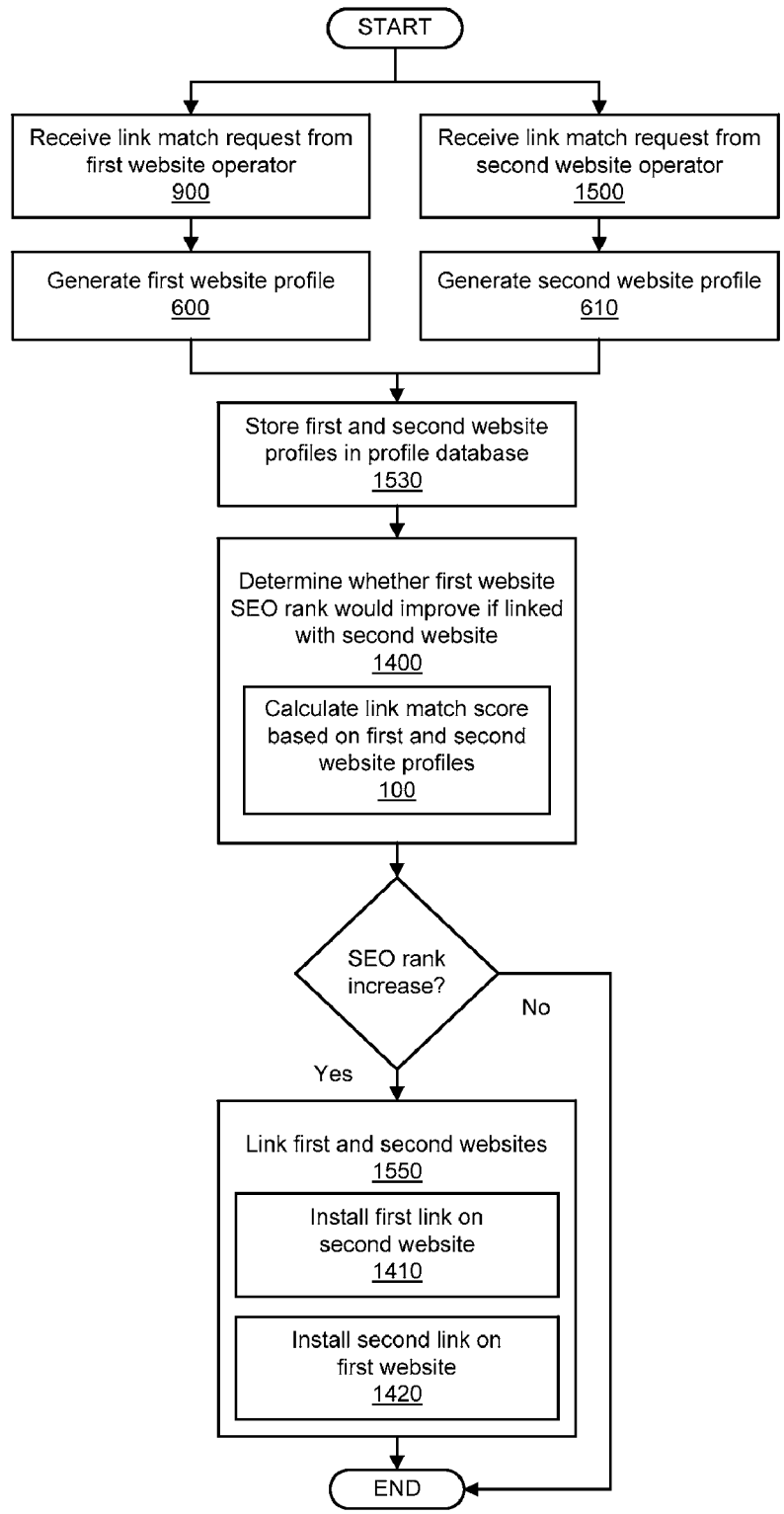
FIG. 15 is a flow diagram illustrating a possible embodiment of a method for predicting website search engine ranking based upon website linking relationships and implementing a website linking relationship.

FIG. 15 illustrates an example method embodiment that builds upon that illustrated in FIG. 14 and further comprises: receiving a link match request from the second website 1240 operator (Step 1500); generating a first website profile 700 for the first website 1200 (Step 600) and a second website profile 800 for the second website 1240 (Step 610); and storing the first website profile 700 and the second website profile 800 in a profile database 1330 communicatively coupled to a network 1230 (Step 1530). Step 1500 may be accomplished in the same manner as Step 900.

Once the website profiles 700 and 800 have been generated (Steps 600 and 610), the link match score may be calculated (Step 100) by determining the degree to which the first website profile 700 correlates with the second website profile 800 as described in detail above. If the link match score indicates that the search engine rank for the first website will increase, the first website 1200 and second website 1240 may be linked (Step 1550), perhaps as described in detail above with respect to Steps 430, 440, 1410, and 1420.

Figure 16:
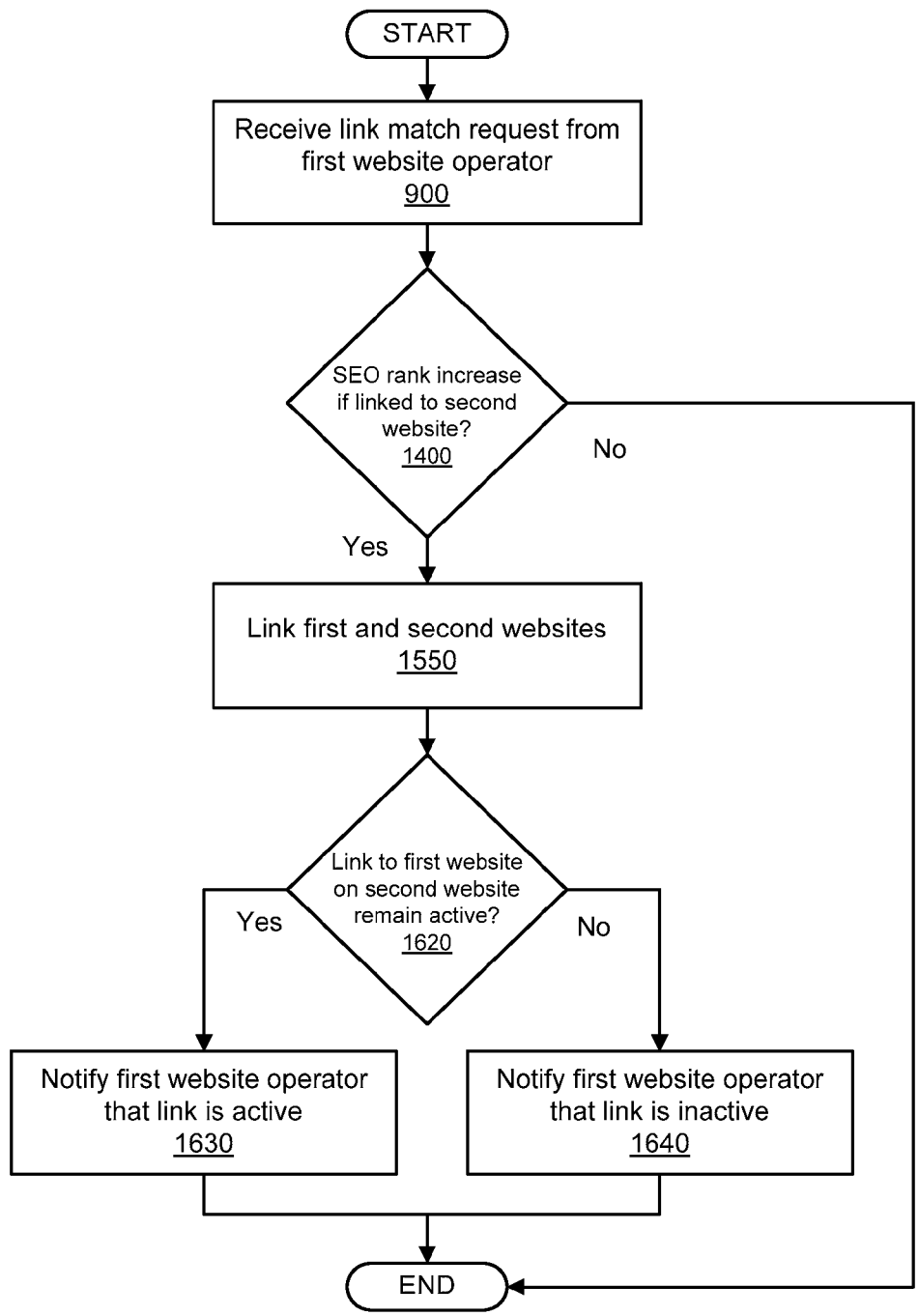
FIG. 16 is a flow diagram illustrating a possible embodiment of a method for predicting website search engine ranking based upon website linking relationships and implementing a website linking relationship.
Figure 17:
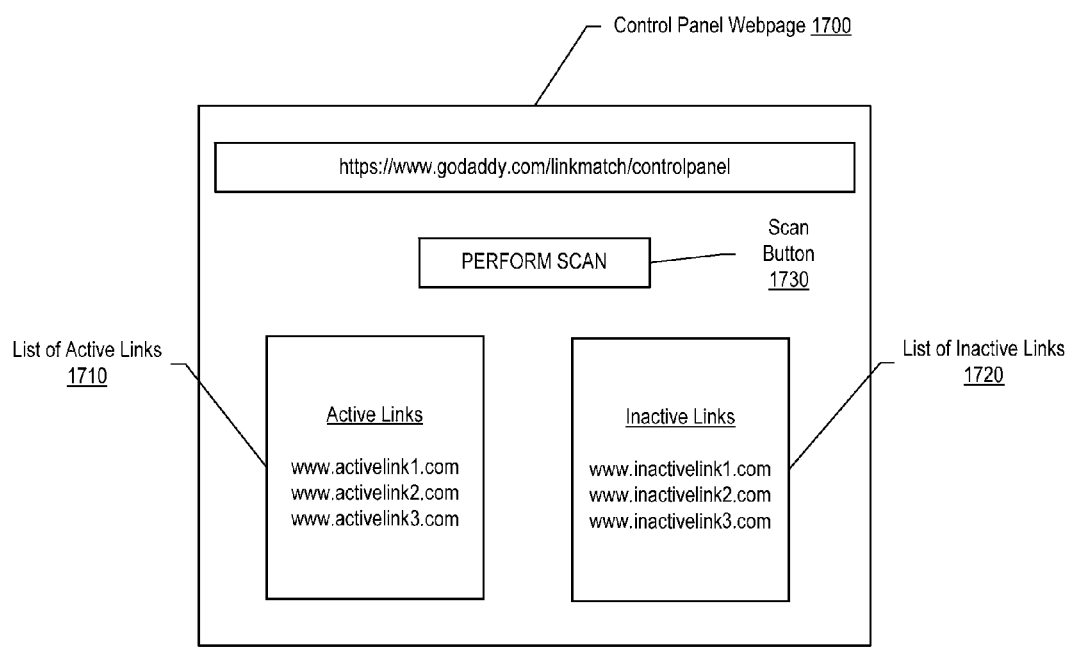
FIG. 17 illustrates a possible embodiment of a control panel webpage for informing users of active and/or inactive links.

FIG. 16 illustrates an alternate method embodiment that builds up those described above by providing a monitoring service for linked websites. As a non-limiting example, such a method may comprise the step of (after the first website 1200 and/or second website 1240 are linked (e.g., Steps 430, 440, 1410, 1420, or 1550)) determining whether the first link to the first website 1200 on the second website 1240 remains an active link (Step 1620). Step 1620 may be accomplished, perhaps by software and/or scripts running on a server 1220 scanning the second website 1240 (e.g., a Web crawler spidering the second website 1240) and determining whether the link to the first website 1200 is present, active, and operational. Such a scan may be automatically performed periodically (e.g., daily or weekly) or whenever requested by the website operator, perhaps by clicking on a scan button 1730 on a control panel webpage 1700 as illustrated in FIG. 17. Where the first website 1200 is linked to a plurality of websites, one or more of the plurality of websites may be scanned.

Responsive to a determination that the first link to the first website 1200 installed on the second website 1240 remains active, the first website 1200 operator may be notified that the first link is active (Step 1630). As non-limiting examples, Step 1630 may be accomplished by transmitting an electronic communication (in any of the forms described above) to the first website 1200 operator, or by displaying a list of active links 1710 on a control panel webpage 1700 accessible only to the first website 1200 operator (perhaps by user authentication protection on the webpage 1700). Where the first website 1200 is linked to a plurality of websites, the electronic communication or control panel webpage 1700 may list, perhaps by URL, each of the plurality of websites having active links to the first website 1200.

Responsive to a determination that the first link to the first website 1200 installed on the second website 1240 remain inactive, the first website 1200 operator may be notified that the first link is inactive (Step 1640), perhaps via the same methodologies described in relation to Step 1630 (e.g., transmitting an electronic communication to the first website 1200 operator, or by displaying a list of inactive links 1720 on a control panel webpage 1700). The second website 1240 operator also may be contacted (perhaps via an electronic communication) and advised that his link to the first website 1200 is inactive. The second website 1240 operator also may be provided a deadline by which the link to the first website 1200 must be restored or, perhaps, a remedy will be implemented, such as deleting one or more links to the second website 1240.

An Example Use of the Systems, Methods, and Tools Described Herein

An operator of a first website 1200 may decide to improve the search engine ranking of his website 1200 by increasing its number of inbound links. To do so, he may sign up for a link matching service by navigating (via a browser running on his Internet-connected client computer 1320) to a link match website provided by a link match service provider. There he may sign up for the link match service by, among other things, providing his contact information (name, address, telephone number, business name, etc.), the URL for his website 1200, and a category for his website 1200 (e.g., "automobiles") (Step 1100).

Software running on the link match service provider's server 1220 (also communicatively coupled to the Internet) may receive the link match request (Step 900) and then generate a first website profile 700 (Step 600). For purposes of this illustration, the first website profile 700 may comprise the first website's 1200 IP address, number of inbound links, PageRank for the first website, Open Directory Project category, and ALEXA ranking. To generate the profile 700, a Web crawler may spider the Internet to obtain the profile data, which is all available via publically-accessible websites and/or APIs (Step 1100). One generated, the first website profile 700 may be stored in the link match service provider's profile database 1330 running on its server 1220.

The link match service provider's software then may calculate a link match score (Step 100) for a plurality of other website profiles stored in the database 1330 that were generated (Step 610) when their respective website operators previously signed up for the link match service. The calculated link match score indicates whether the first website's 1200 search engine ranking would improve if it were linked to from one or more of the other websites in the profile database 1330. For each such website, the server 1220 may determine whether it has a different IP address than the first website 1200, whether it has a similar Open Directory Project category as the first website 1200, its PageRank, its ALEXA ranking, and its number of inbound links.

For example, a website's link match score may be initially set at 50% because the IP addresses are different, raised to 60% because the second website 1240 has more than one inbound link, raised again to 70% because the second website 1240 has a PageRank of greater than one, raised again to 80% because their ODP-assigned categories match, but then decreased back to 70% because it has a poor ALEXA ranking. Other websites in the database may have calculated link match scores of, for example, 20%, 40%, and 60%.

Figure 18:
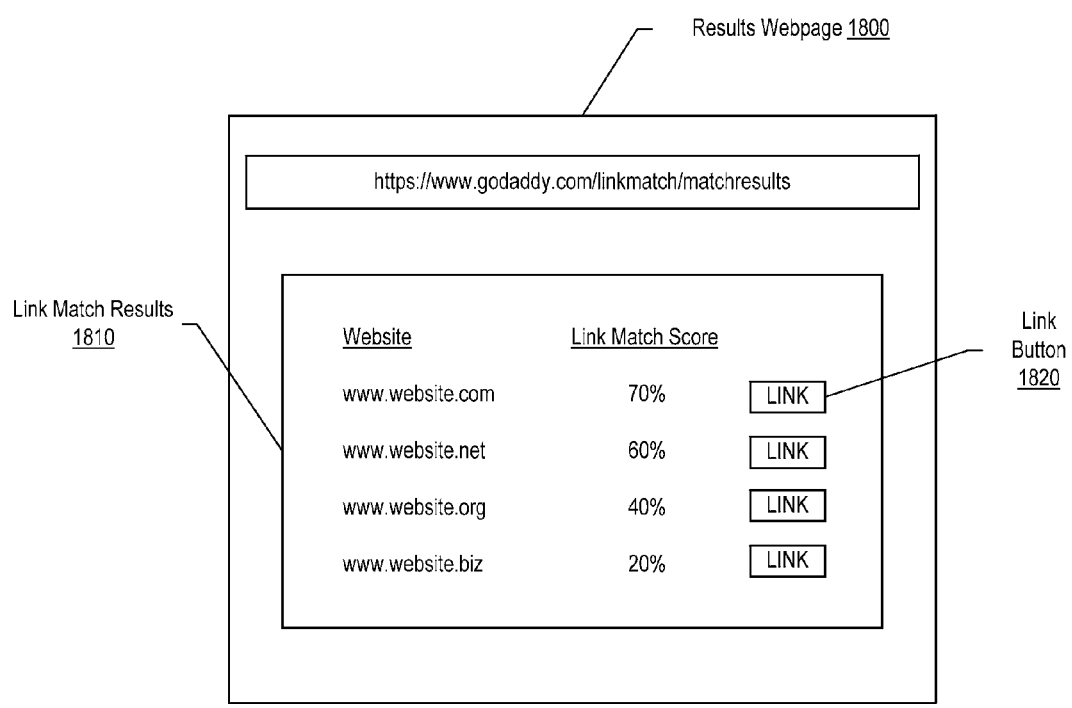
FIG. 18 illustrates a possible embodiment of a webpage for informing users of link match scores.

The server 1220 may then present link match scores (Step 300) to the first website 1200 operator by transmitting HTML code via the Internet to his client computer 1320 that, when rendered in its browser, lists link match results 1810 (e.g., the ranked websites along with their corresponding link match scores as illustrated in FIG. 18), perhaps as follows:

| Website | Link March Score |
|---|---|
| www.website.com | 70% |
| www.website.net | 60% |
| www.website.org | 40% |
| www.website.biz | 20% |

The first website 1200 operator then may opt to request a linking relationship with a second website 1240 having the highest link match score (www.website.com in the example), perhaps by clicking the "link" button 1820 on the results webpage 1800. When this request is received by the server 1220 (Step 400), it may transmit a request to the second website 1240 operator (perhaps by an email to an email address provided by the second website 1240 operator when he signed up for the link match service) asking whether the second website 1240 operator wishes to enter a linking relationship with the first website 1200 (Step 410).

If the server 1220 subsequently receives an acceptance of the link match request from the second website 1240 operator (Step 420), perhaps via return email, the server 1220 may transmit, perhaps as an email attachment, a first code comprising a first link to the first website 1200 to the second website's 1240's operator (Step 430) and a second code comprising a second link to the second website 1240 to the first website's 1200 operator (Step 440) for installation on their respective websites.

Once the links are installed on their respective websites by the first and second website operators, they may be monitored by the link match service provider, perhaps by a Web crawler spidering and scanning the websites to determine whether the links are present, active, and operational (Step 1620). A control panel webpage 1700 may be used to notify the website operators whether the links to their respective websites remain active (Steps 1630 and 1640). If the website operators would like another scan performed, they may simply log into their web-based account with the link match service provider, access the control panel webpage 1700, click the scan button 1730 and the scan will repeat itself and the control panel webpage 1700 may refresh with the results of the most recent scan.

The foregoing embodiments have been presented for the purpose of illustration. They are not intended to be exhaustive or to limit the invention to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments also may relate to systems or apparatus for performing the operations herein. Such apparatus may be specially constructed for the required purposes, and/or may comprise a general-purpose computing device selectively activated or configured by a computer program stored in the computer. Such a computer program may be stored in a tangible computer readable storage medium or any type of media suitable for storing electronic instructions, and perhaps coupled to a computer system bus. Furthermore, any computing systems referred to in the specification may include a single processor or may be architectures employing multiple processor designs for increased computing capability.

Some embodiments of the invention also may relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

The language used in the specification has been principally selected for readability and instructional purposes, and it may not have been selected to delineate or circumscribe the inventive subject matter. It is therefore intended that the scope of the inventions be limited not by this detailed description, but rather by any claims that issue on an application based hereon. Accordingly, the disclosure of the embodiments of the invention is intended to be illustrative, but not limiting, of the scope of the invention, which is set forth in the accompanying claims.

Thus, other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A system, comprising:
A) at least one server computer having a processor and being configured to:
  i) calculate a link match score indicating whether a search engine ranking for a first website hosted on a first hosting server having a first internet protocol address would improve if said first website entered a linking relationship with a second website hosted on a second hosting server having a second internet protocol address,
  ii) determine whether said link match score exceeds a predetermined value, and
  iii) recommend, responsive to a determination that said link match score exceeds said predetermined value, said linking relationship to an operator of said first website or an operator of said second website, wherein said link match score is a function of whether said first internet protocol address is similar to said second internet protocol address, said link match score being calculated by:
    i) generating a first website profile for said first website, said first website profile comprising:
      a) a domain name for said first website;
      b) said first internet protocol address;
      c) a number of inbound links to said first website;
      d) a PageRank for said first website;
      e) an Open Directory Project category for said first website;
      f) at least one keyword for said first website; and
      g) a popularity ranking for said first website;
    ii) generating a second website profile for said second website, said second website profile comprising:
      a) a domain name for said second website;
      b) said second internet protocol address;
      c) a number of inbound links to said second website;
      d) a PageRank for said second website;
      e) an Open Directory Project category for said second website;
      f) at least one keyword for said second website; and
      g) a popularity ranking for said second website; and
    iii) calculating said link match score, wherein said link match score is based upon a calculated correlation between said first website profile and said second website profile, wherein said link match score indicates an improved search engine ranking for said first website where said calculated correlation is greater than 0.5, wherein said first internet protocol address comprises a first class C internet protocol address and said second internet protocol address comprises a second class C internet protocol address, wherein said calculated correlation is initially set at greater than 0.5 if a first three octets of said first class C internet protocol address does not match a first three octets of said second class C internet protocol address; and
B) said at least one server computer further comprising a profile database storing said first website profile and said second website profile.

2. The system of claim 1, wherein said link match score indicates an improved search engine ranking for said first website where said first internet protocol address does not match said second internet protocol address.

3. The system of claim 1, wherein said first internet protocol address comprises a first class C internet protocol address and said second internet protocol address comprises a second class C internet protocol address, wherein said link match score is a function of whether a first three octets of said first class C internet protocol address matches a first three octets of said second class C internet protocol address.

4. The system of claim 3, wherein said link match score indicates an improved search engine ranking for said first website where said first three octets of said first class C internet protocol address do not match said first three octets of said second class C internet protocol address.

5. The system of claim 4, wherein said link match score is further a function of a number of inbound links to said second website.

6. The system of claim 5, wherein said link match score is further a function of a PageRank for said second website.

7. The system of claim 6, wherein said link match score is further a function of whether an Open Directory Project category for said first website matches an Open Directory Project category for said second website.

8. The system of claim 7, wherein said link match score is further a function of whether a keyword for said first website matches a keyword for said second website.

9. The system of claim 8, wherein said keyword for said first website is received from an operator of said first website and said keyword for said second website is received from an operator of said second website.

10. The system of claim 8, wherein said keyword for said first website and said keyword for said second website are obtained by crawling said first website and said second website.

11. The system of claim 8, wherein said link match score is further a function of a popularity rank for said second website.

12. The system of claim 1, wherein said at least one server computer is further configured to: present said link match score to an operator of said first website.

13. The system of claim 12, wherein said at least one server computer is further configured to: receive from said operator of said first website a request to enter said linking relationship with said second website.

14. The system of claim 13, wherein said at least one server computer is further configured to: transmit request to an operator of said second website.

15. The system of claim 14, wherein said at least one server computer is further configured to: receive from said operator of said second website an acceptance of said request.

16. The system of claim 15, wherein said at least one server computer is further configured to: transmit, to said operator of said first website, a second code comprising a second link to said second website.

17. The system of claim 16, wherein said at least one server computer is further configured to: transmit, to said operator of said second website, a first code comprising a first link to said first website.

18. The system of claim 1, wherein said link match score indicates an improved search engine ranking for said first website where said calculated correlation is high.

19. The system of claim 1, wherein said calculated correlation has a minimum value of 0 and a maximum value of 1.

20. The system of claim 1, wherein said calculated correlation is initially set at greater than 0.5 where said internet protocol address for said first website does not match said internet protocol address for said second website.

21. The system of claim 1, wherein said calculated correlation is reset at a higher value if a number of inbound links to said second website is greater than 1.

22. The system of claim 21, wherein said calculated correlation is reset at a higher value if a PageRank for said second website is greater than 1.

23. The system of claim 22, wherein said calculated correlation is reset at a higher value if an Open Directory Project category for said first website matches an Open Directory Project category for said second website.

24. The system of claim 23, wherein said calculated correlation is reset at a higher value if a keyword for said first website matches a keyword for said second website.

25. The system of claim 24, wherein said calculated correlation is reset at a higher value if a popularity ranking for said second website is high.

* * * * *